(12) United States Patent
Zijsling et al.

(10) Patent No.: US 10,000,990 B2
(45) Date of Patent: Jun. 19, 2018

(54) SYSTEM AND METHOD FOR CREATING A SEALING TUBULAR CONNECTION IN A WELLBORE

(71) Applicant: SHELL OIL COMPANY, Houston, TX (US)

(72) Inventors: Djurre Hans Zijsling, Rijswijk (NL); Antonius Leonardus Maria Wubben, Rijswijk (NL); Wissam Assaad, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days. days.

(21) Appl. No.: 15/320,072

(22) PCT Filed: Jun. 24, 2015

(86) PCT No.: PCT/EP2015/064271
§ 371 (c)(1),
(2) Date: Dec. 19, 2016

(87) PCT Pub. No.: WO2015/197702
PCT Pub. Date: Dec. 30, 2015

(65) Prior Publication Data
US 2017/0145778 A1 May 25, 2017

(30) Foreign Application Priority Data
Jun. 25, 2014 (EP) .................................... 14173874

(51) Int. Cl.
*E21B 33/12* (2006.01)
*E21B 43/10* (2006.01)
(Continued)

(52) U.S. Cl.
CPC .......... *E21B 33/1208* (2013.01); *E21B 33/14* (2013.01); *E21B 43/103* (2013.01);
(Continued)

(58) Field of Classification Search
CPC ..................................................... E21B 43/103
(Continued)

(56) References Cited

U.S. PATENT DOCUMENTS

| 4,068,868 A | * | 1/1978 | Ohrt | E21B 17/085 285/223 |
| 5,348,095 A | | 9/1994 | Worrall et al. | |

(Continued)

FOREIGN PATENT DOCUMENTS

| WO | 9800626 | 1/1998 |
| WO | 9935368 | 7/1999 |

(Continued)

OTHER PUBLICATIONS

De Graaf, Ed et al., "O-Ring Technical Handbook", NewDealSeals, 2008, The Netherlands, http://www.newedealseals.com/catalogues/O-Rings.pdf, 211 pages.

*Primary Examiner* — D. Andrews
*Assistant Examiner* — Dany E Akakpo

(57) ABSTRACT

A system for sealing an expandable tubular connection (2, 20) in a wellbore comprises an annular resilient seal (32, 34) arranged in an annular groove (90) defining a section (82) of reduced wall thickness of an inner tubular element (20), which section (82) is subject to surplus expansion induced by an expansion cone such that, in the expanded state of the inner tubular element (20), the annular groove (90) has a wave-shaped profile thereby compressing the annular seal (32, 34) against an outer tubular element (2).

20 Claims, 7 Drawing Sheets

(51) Int. Cl.
*E21B 33/14* (2006.01)
*F16L 13/14* (2006.01)

(52) U.S. Cl.
CPC .......... *E21B 43/105* (2013.01); *E21B 43/106* (2013.01); *F16L 13/147* (2013.01)

(58) Field of Classification Search
USPC ........................................................ 277/314
See application file for complete search history.

(56) References Cited

U.S. PATENT DOCUMENTS

| | | | |
|---|---|---|---|
| 5,366,012 A | 11/1994 | Lohbeck | |
| 5,667,011 A | 9/1997 | Gill et al. | |
| 5,901,789 A | 5/1999 | Donnelly et al. | |
| 5,960,895 A | 10/1999 | Chevallier et al. | |
| 5,984,568 A | 11/1999 | Lohbeck | |
| 6,012,522 A | 1/2000 | Donnelly et al. | |
| 6,070,671 A | 6/2000 | Cumming et al. | |
| 6,196,316 B1 | 3/2001 | Bosma et al. | |
| 6,253,846 B1 | 7/2001 | Nazzal et al. | |
| 6,253,850 B1 | 7/2001 | Nazzal et al. | |
| 6,273,634 B1 | 8/2001 | Lohbeck | |
| 6,315,040 B1 | 11/2001 | Donnelly | |
| 6,328,113 B1 | 12/2001 | Cook | |
| 6,371,203 B2 | 4/2002 | Frank et al. | |
| 6,419,025 B1 | 7/2002 | Lohbeck et al. | |
| 6,431,282 B1 | 8/2002 | Bosma et al. | |
| 6,454,493 B1 | 9/2002 | Lohbeck | |
| 6,460,615 B1 | 10/2002 | Heijnen | |
| 6,470,966 B2 | 10/2002 | Cook et al. | |
| 6,497,289 B1 | 12/2002 | Cook et al. | |
| 6,557,640 B1 | 5/2003 | Cook et al. | |
| 6,561,227 B2 | 5/2003 | Cook et al. | |
| 6,564,875 B1 | 5/2003 | Bullock | |
| 6,568,471 B1 | 5/2003 | Cook et al. | |
| 6,575,250 B1 | 6/2003 | Wijsman | |
| 6,604,763 B1 | 8/2003 | Cook et al. | |
| 6,607,046 B1 | 8/2003 | Betts et al. | |
| 6,631,759 B2 | 10/2003 | Cook et al. | |
| 6,631,769 B2 | 10/2003 | Cook et al. | |
| 6,634,431 B2 | 10/2003 | Cook et al. | |
| 6,640,903 B1 | 11/2003 | Cook et al. | |
| 6,684,947 B2 | 2/2004 | Cook et al. | |
| 6,685,238 B1 | 2/2004 | Pouillard | |
| 6,705,395 B2 | 3/2004 | Cook et al. | |
| 6,712,154 B2 | 3/2004 | Cook et al. | |
| 6,725,919 B2 | 4/2004 | Cook et al. | |
| 6,739,392 B2 | 5/2004 | Cook et al. | |
| 6,745,845 B2 | 6/2004 | Cook et al. | |
| 6,758,278 B2 | 7/2004 | Cook et al. | |
| 6,823,937 B1 | 11/2004 | Cook et al. | |
| 6,857,473 B2 | 2/2005 | Cook et al. | |
| 6,860,420 B2 | 3/2005 | Filippov et al. | |
| 6,892,819 B2 | 5/2005 | Cook et al. | |
| 6,907,652 B1 | 6/2005 | Heijnen | |
| 6,966,370 B2 | 11/2005 | Cook et al. | |
| 7,040,396 B2 | 5/2006 | Cook et al. | |
| 7,048,067 B1 | 5/2006 | Cook et al. | |
| 7,063,142 B2 | 6/2006 | Cook et al. | |
| 7,152,673 B2 | 12/2006 | Lohbeck et al. | |
| 7,240,728 B2 | 7/2007 | Cook et al. | |
| 7,357,188 B1 | 4/2008 | Cook et al. | |
| 7,360,604 B2 | 4/2008 | Lohbeck et al. | |
| 7,389,822 B2 | 6/2008 | Lohbeck et al. | |
| 7,475,723 B2 | 1/2009 | Ring et al. | |
| 7,556,092 B2 | 7/2009 | Cook et al. | |
| 7,730,965 B2 | 6/2010 | Jordan et al. | |
| 2002/0148612 A1 | 10/2002 | Cook et al. | |
| 2002/0175474 A1 | 11/2002 | Simpson et al. | |
| 2003/0024708 A1* | 2/2003 | Ring ................. E21B 7/208 166/380 |
| 2005/0057005 A1 | 3/2005 | Simpson et al. | |
| 2009/0200041 A1 | 8/2009 | Watson | |
| 2010/0122820 A1 | 5/2010 | Holland | |
| 2012/0205872 A1 | 8/2012 | Reinhardt et al. | |
| 2013/0248209 A1 | 9/2013 | Watson | |

FOREIGN PATENT DOCUMENTS

| | | |
|---|---|---|
| WO | 2000037772 | 6/2000 |
| WO | 200104535 | 1/2001 |
| WO | 2015197703 | 12/2015 |
| WO | 2015197705 | 12/2015 |

* cited by examiner

SYSTEM AND METHOD FOR CREATING A SEALING TUBULAR CONNECTION IN A WELLBORE

CROSS REFERENCE TO RELATED APPLICATIONS

The present application is a National Stage (§ 371) of International Application No. PCT/EP2015/064271, filed Jun. 24, 2015, which claims the benefit of European Application No. 14173874.0, filed Jun. 25, 2014.

FIELD

The present invention relates to a system and a method for creating a sealing tubular connection in a wellbore.

BACKGROUND

Wellbores for the production of hydrocarbon fluid generally are provided with steel casings and/or liners to provide stability to the wellbore wall and to prevent undesired flow of fluid between the wellbore and the surrounding earth formation. A casing generally extends from surface into the wellbore, whereas a liner may extend only a lower portion of the wellbore. However in the present description the terms "casing" and "liner" are used interchangeably and without such intended difference.

In a conventional wellbore, the wellbore is drilled in sections whereby each section is drilled using a drill string that has to be lowered into the wellbore through a previously installed casing. In view thereof the wellbore and the subsequent casing sections decrease in diameter with depth. The production zone of the wellbore therefore has a relatively small diameter in comparison to the upper portion of the wellbore. In view thereof it has been proposed to drill a "mono diameter" wellbore whereby the casing or liner to be installed is radially expanded in the wellbore after lowering to the required depth. Subsequent wellbore sections therefore may be drilled at a diameter larger than in the conventional wellbore. If each casing section is expanded to the same diameter as the previous section, the wellbore diameter may remain substantially constant with depth.

In applications whereby the tubular element needs to be radially expanded in compressive contact with a previously installed tubular element to form a tubular connection, it is generally required that the tubular connection is sealed so as to withstand differential fluid pressures between the interior and the exterior of the connection. Several attempts have been made to provide such sealing connection.

US 2010/0122820 A1 discloses an expandable tubular including a tubular body and a plurality of seals having a corrugation on an external surface of the tubular body. During expansion, the corrugations of the seals straighten out. However, expansion of the tubular body needs to be controlled accurately since there is a risk that the seals are damaged if too strongly compressed against the previous tubular element, and a risk of inadequate sealing functionality if too loosely compressed against the previous tubular element.

US 2012/0205872 A1 discloses an assembly with a seal between an expandable first tubular and a second tubular whereby an annular member is attached to the first tubular, the annular member having a groove on the outer surface in which a seal member is disposed. The seal member is configured to be expandable radially outward into contact with an inner wall of the second tubular. It is a drawback of the known assembly that the seal member protrudes outside the groove and is therefore vulnerable to damage during running-in into the wellbore.

Other expandable tubular assemblies with sealing rings arranged in recesses are known from US patent applications US2002/0148612, US2002/0175474 and US2013/0248209.

The system and method according to the preamble of claims 1 and 15 are known from US patent application US2005/057005, which discloses the use of lip type seals that are arranged in a generally cylindrical recess that remains generally cylindrical after expansion with the risk of inadequate sealing if the seals are too loosely compressed against the outer tubular element.

It is an object of the invention to provide an improved sealing tubular connection that overcomes the drawbacks of the prior art.

SUMMARY

In accordance with the invention there is provided a system for creating a sealing tubular connection in a wellbore, the system comprising:
  an outer tubular element;
  an inner tubular element extending into the outer tubular element and being adapted to be radially expanded against the outer tubular element by an expansion cone;
  an annular groove defining a section of reduced wall thickness of the inner tubular element relative to a remaining section of the inner tubular element; and
  at least one annular seal of resilient material positioned in the annular groove, each annular seal having a radial thickness, which is smaller than, or equal to, a depth of the annular groove;
    characterized in that the section of reduced wall thickness is adapted to be subject to surplus expansion induced by the expansion cone such that, in the expanded state of the inner tubular element, the annular groove has a wave-shaped profile and the annular seal is compressed against the outer tubular element.

The invention also relates to a method of creating a sealing tubular connection in a wellbore, the method comprising:
  providing an outer tubular element and an inner tubular element extending into the outer tubular element, the inner tubular element being adapted to be radially expanded against the outer tubular element, wherein the inner tubular element is provided with an annular groove defining a section of reduced wall thickness of the inner tubular element relative to a remaining section of the inner tubular element;
  arranging in the annular groove at least one annular seal of resilient material having a radial thickness which is smaller than, or equal to, a depth of the annular groove; and
  radially expanding the inner tubular element against the outer tubular element using an expansion cone positioned in the inner tubular element;
    characterized in that the section of reduced wall thickness subject to surplus expansion induced by the expansion cone such that, in the expanded state of the inner tubular element, the annular groove has a wave-shaped profile and the annular seal is compressed against the outer tubular element.

BRIEF DESCRIPTION OF THE DRAWINGS

The invention will be described hereinafter in more detail and by way of example, with reference to the accompanying schematic drawings in which.

In the description herein below and the figures, like reference numerals relate to like components.

DETAILED DESCRIPTION

Figure 1:
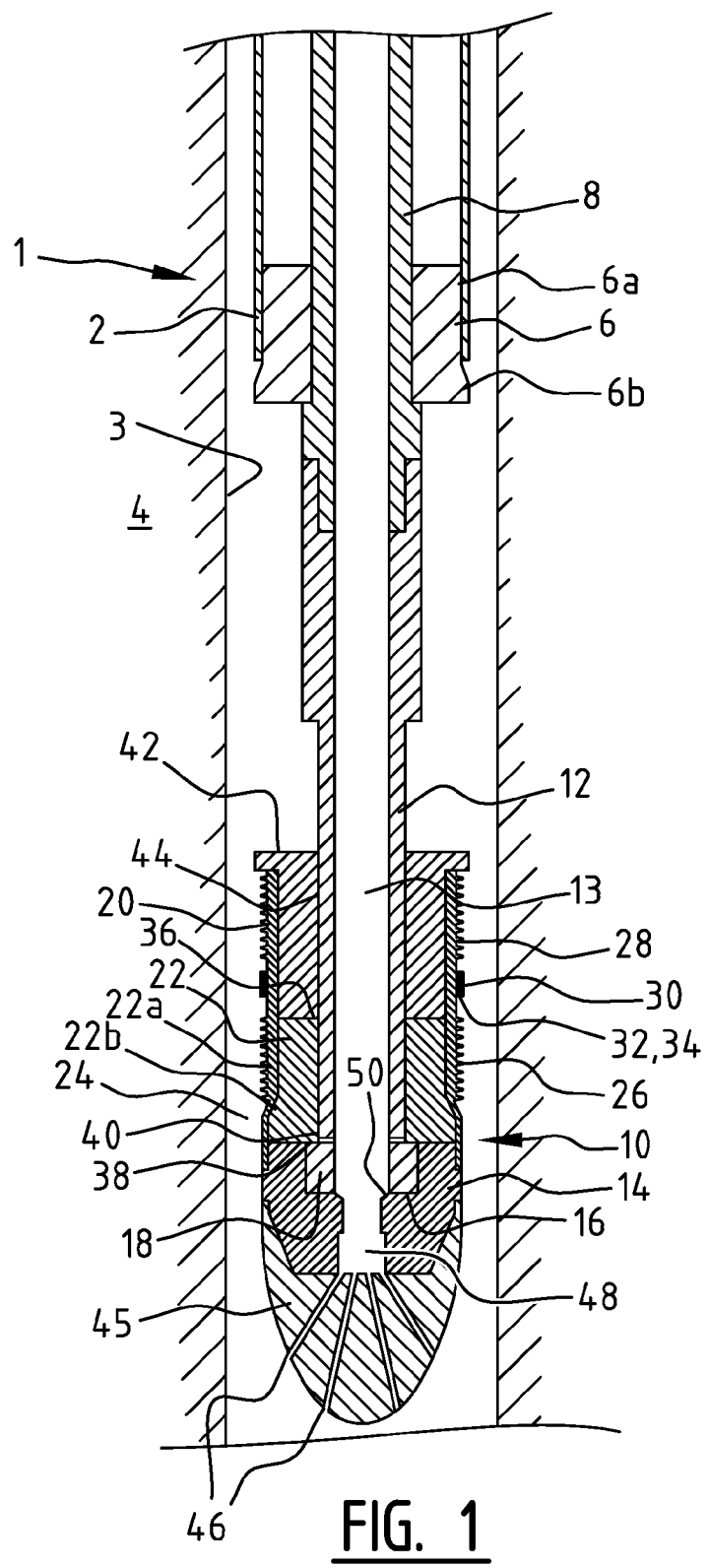
FIG. 1 schematically shows, in longitudinal section, a first embodiment of the system of the invention in an assembly for setting a bottom plug.

The presently proposed system includes an annular seal in an annular groove, the annular seal having a thickness which is smaller than or equal to the depth of the annular groove.

In this manner it is achieved that each annular seal is protected from damage during running-in of the inner tubular element into the wellbore since the seal does not radially extend outside the groove, while also compression of the annular seal against the outer tubular element after expansion of the inner tubular element is obtained by virtue of the phenomenon of surplus expansion of the section of reduced wall thickness. The degree of compression of the annular seal is dependent on the radial size of the annular seal and on the amount of surplus expansion of the section of reduced wall thickness. Surplus expansion is a known phenomenon which implies that when a tubular element is radially expanded by an expansion cone, the tubular element expands to a slightly larger diameter than the maximum diameter of the expansion cone. The section of reduced wall thickness undergoes surplus expansion whereas the remaining section is prevented from surplus expansion by virtue of being in compressive contact with the outer tubular element after expansion. The amount of surplus expansion of the section of reduced wall thickness is dependent on, for example, the geometry of the expansion cone and the depth and length of the groove. Therefore, the degree of compression of each annular seal may be controlled by selecting suitable parameter values for the geometry of the expansion cone and the annular groove.

Advantageously each annular seal comprises an elastomer material of hardness between 70-90 Shore A and the wave-shaped profile has a W-shape and for each annular seal the W-shaped profile defines a chamber in the annular groove that converges in axial direction away from the annular seal.

In an exemplary embodiment, with the inner tubular element in the unexpanded state, each annular seal has an aspect ratio h/w between 3-5 whereby h is radial thickness of the annular seal and w is axial length of the annular seal.

In applications whereby a wear groove may be formed at the inner surface of the outer tubular element, for example due to sliding of a drill string along said inner surface, suitably the ratio h/k is larger than 5 whereby ft is radial thickness of the annular seal and k is depth of the wear groove.

To optimize surplus expansion of the section of reduced wall thickness, the expansion cone may have a conical section and a rounded section at the large diameter end of the conical section, wherein the ratio R/t is less than 20 whereby R is round-off radius of the rounded section and t is wall thickness of said remaining section of the inner tubular element.

Suitably the annular groove has opposite axial ends, and each annular seal is axially spaced from at least one of the axial ends of the groove.

Each annular seal may be axially spaced from at least one of said axial ends at a spacing L, wherein the ratio L/t is larger than 9 whereby t is wall thickness of said remaining section of the inner tubular element.

In an exemplary embodiment, each annular seal is arranged in a central part of the annular groove.

Improved sealing functionality is achieved with a first annular seal and a second annular seal whereby a spacing s is present between the first and second annular seals, and wherein the ratio s/w is between 1-2 whereby w is the axial length of at least one of the first and second annular seals. The first and second annular seals may be substantially identical.

Each annular seal may be bonded to the surface of the annular groove by vulcanizing.

The outer and inner tubular elements are, for example, wellbore casings or liners extending in a borehole formed in an earth formation.

Referring to FIG. 1 there is shown an assembly 1 for expanding a steel tubular element 2 in a wellbore 3 extending into an earth formation 4. The assembly 1 comprises a primary expander 6 connected to an expansion mandrel 8 suspended in the wellbore 3 on a drill string (not shown) that normally may be used for drilling of the wellbore. The primary expander 6 has a cylindrical upper portion 6a of diameter substantially equal to the inner diameter of the unexpanded tubular element 2 and a conical lower portion 6b of diametrical size adapted to expand the tubular element 2 to the desired diameter to form a liner in the wellbore 3. The tubular element 2 is suspended on the primary expander 6 whereby the cylindrical portion 6a thereof extends into the lower end of the tubular element 2.

The assembly 1 furthermore comprises a bottom plug 10 arranged below the primary expander 6 and connected to a plug mandrel 12 in releasable manner, the plug mandrel being fixedly connected to the lower end of the expansion mandrel 8. The plug mandrel 12, the expansion mandrel 8 and the drill string have a common fluid channel 13 for fluid pumped from surface to the bottom plug 10. The bottom plug 10 comprises a flange 14 having a recess 16 into which a lower end part 18 of the plug mandrel 12 fits. The recess 16 and lower end part 18 have complementary hexagonal shapes so as to allow torque to be transmitted between the plug mandrel 12 and the bottom plug 10, however any other suitable shape may be selected to allow torque to be transmitted. A radially expandable tubular clad element 20 is fixedly connected to the flange 14 and extends coaxially around the plug mandrel 12. A secondary expander 22 is arranged inside the clad element 20, the secondary expander having a cylindrical upper portion 22a of diameter substantially equal to the inner diameter of the unexpanded clad element 20 and a conical lower portion 22b of maximum diameter adapted to expand the clad element 20 against the inner surface of tubular element 2 after radial expansion thereof. The clad element 20 has a launcher section in the form of thin walled lower section 24 with an oversized inner diameter to accommodate the conical lower portion 22b of the secondary expander. The clad element further includes a lower anchoring section 26, an upper anchoring section 28 axially spaced from the lower anchoring section, and a sealing section 30 located between the lower and upper anchoring sections 26, 28. Each anchoring section 26, 28 is at the outer surface provided with a coating of friction material, for example a coating including carbide particles embedded in a substrate that is metallically bonded to the outer surface by means of laser welding. The sealing section 30 is at the outer surface provided with annular seals 34 of resilient material, for example an elastomer material. The sealing section 30 will be described in more detail hereinafter.

The plug mandrel 12 extends through a central bore 36 of the secondary expander 22 in a manner allowing the secondary expander 22 to slide in axial direction along the plug mandrel 12. The plug mandrel 12 is provided with flow ports 38 fluidly connecting the fluid channel 13 with a fluid chamber 40 formed between the large diameter end of the secondary expander 22 and the flange 14. Initially the axial size of the fluid chamber 40 is very small but increases during expansion of the clad element 20 as will be explained hereinafter. The upper end of the clad element 20 is covered by a removable debris cap 42 having a central bore 44 through which the plug mandrel 12 extends in a manner allowing the debris cap 42 to slide in axial direction along the plug mandrel 12. The debris cap 42 serves to prevent debris entering the clad element 20 prior to radial expansion thereof. Further, the bottom plug 10 is provided with a reamer 45 having outlet openings 46 in fluid communication with the fluid channel 13 via a bore 48 in the flange 14, the bore 48 having a seat 50 for receiving a trailing plug 52 to close the bore (FIG. 2).

Figure 2:
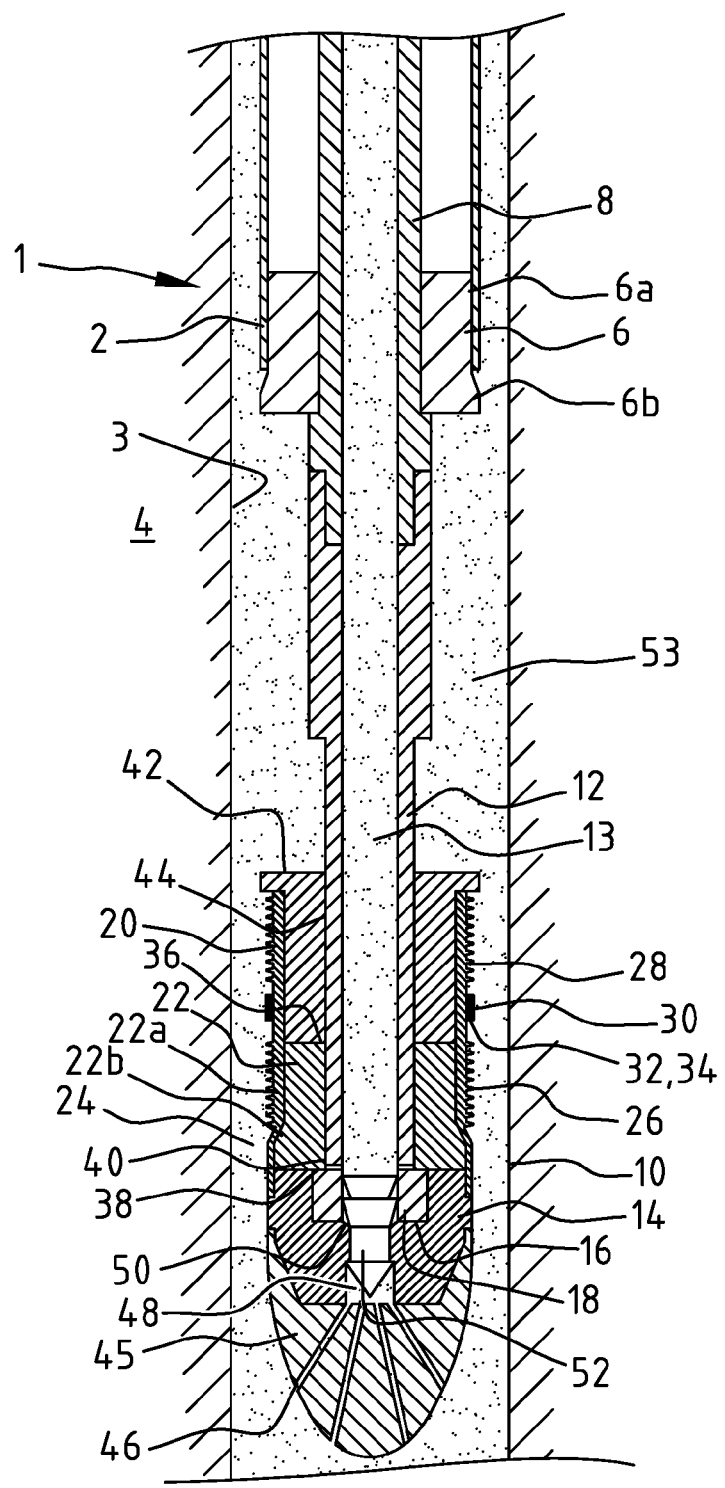
FIG. 2 schematically shows the assembly after pumping cement into the wellbore.

FIG. 2 shows the assembly 1 whereby a fluidic cement column 53 surrounds the tubular element 2 and the assembly 1. The trailing plug 52 is received on the seat of the bore 48 and thereby closes the bore 48.

Figure 3:
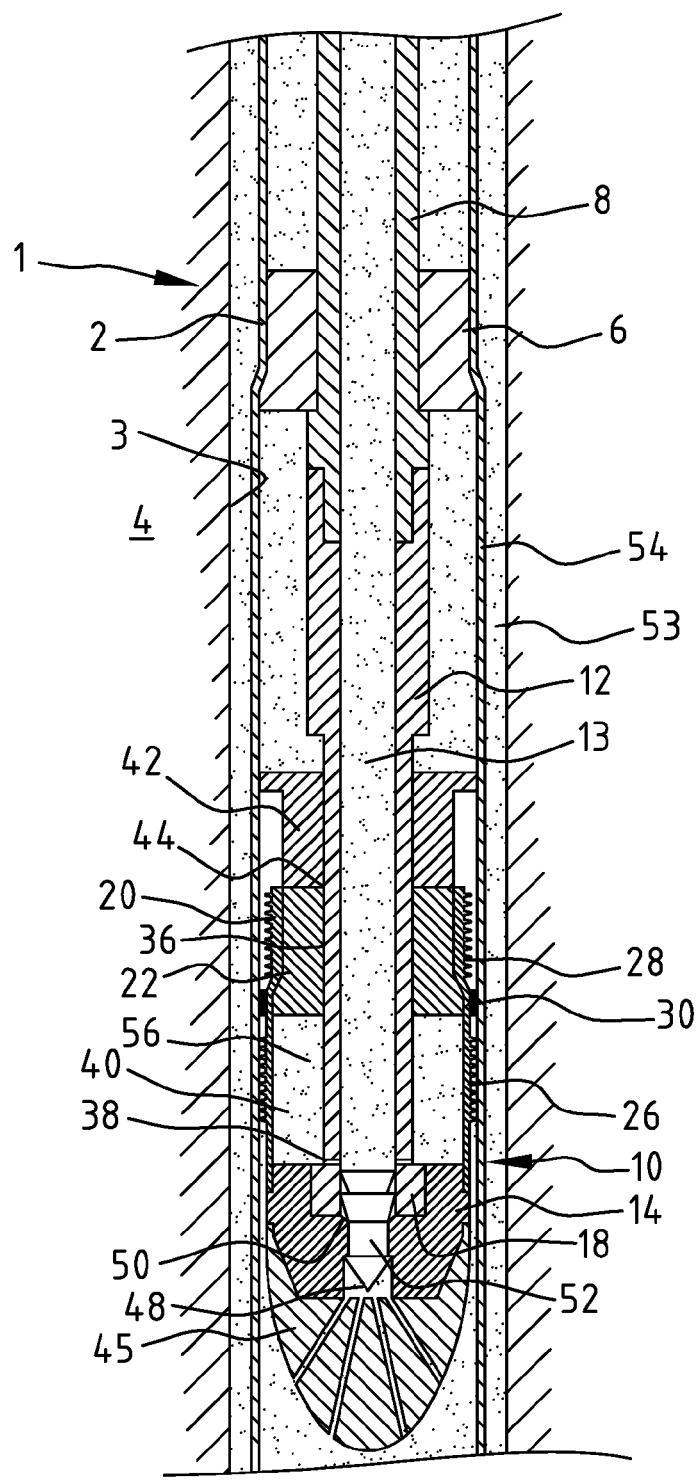
FIG. 3 schematically shows the assembly during expansion of a clad element.

FIG. 3 shows the assembly 1 after a lower portion 54 of the tubular element 2 has been expanded by the primary expander 6, whereby the bottom plug 10 is positioned in the expanded lower portion 54 and the clad element 20 is partly expanded against the inner surface of the expanded lower portion 54. A volume of hydraulic fluid 56, such as spacer fluid or drilling fluid, has been pumped into the fluid chamber 40 via the fluid channel 13 and flow ports 38.

Figure 4:
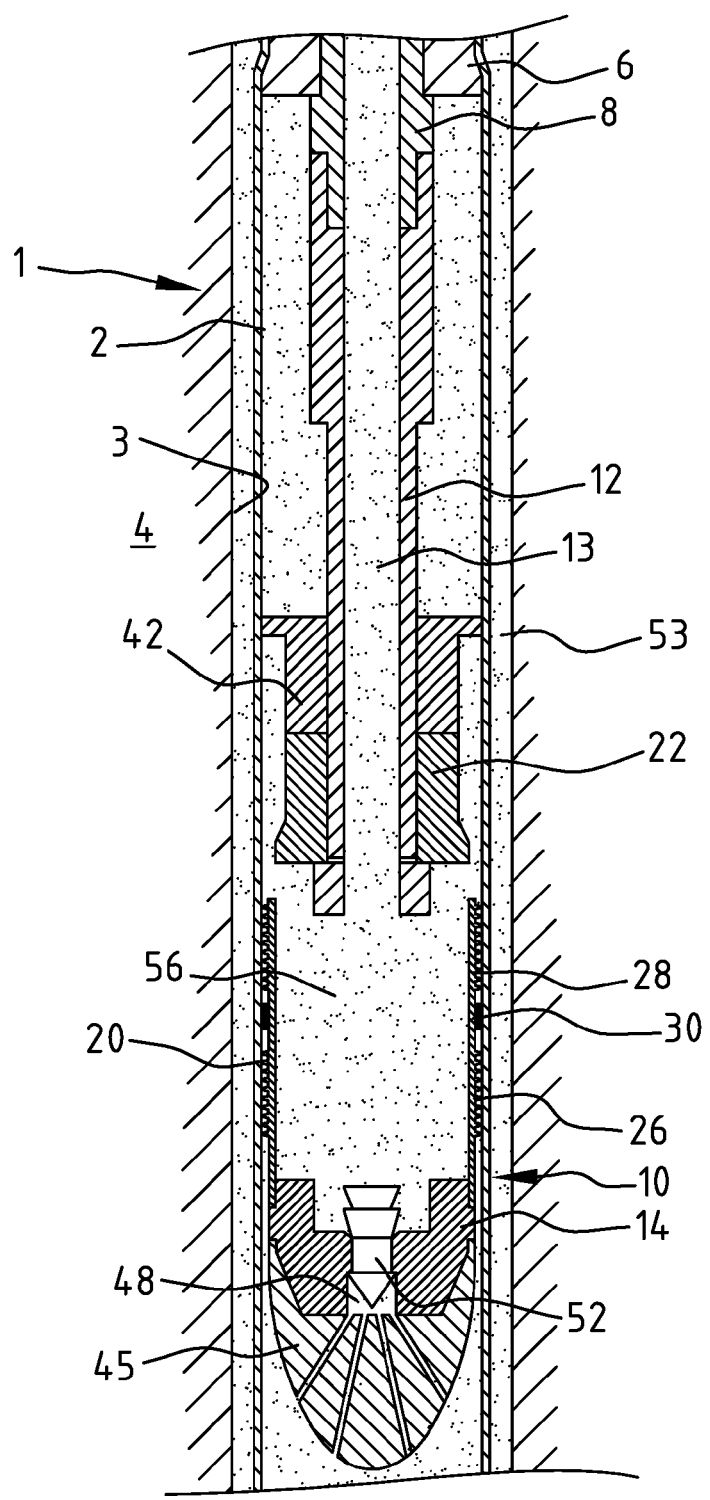
FIG. 4 schematically shows the assembly after the bottom plug has been set.

FIG. 4 shows the assembly 1 after the clad element 20 has been fully expanded against the inner surface of the expanded lower portion 54 of the tubular element 2, whereby the plug mandrel 12 is released from the flange 14. The secondary expander 22 and the debris cap 42 are still positioned at the plug mandrel.

Figure 5:
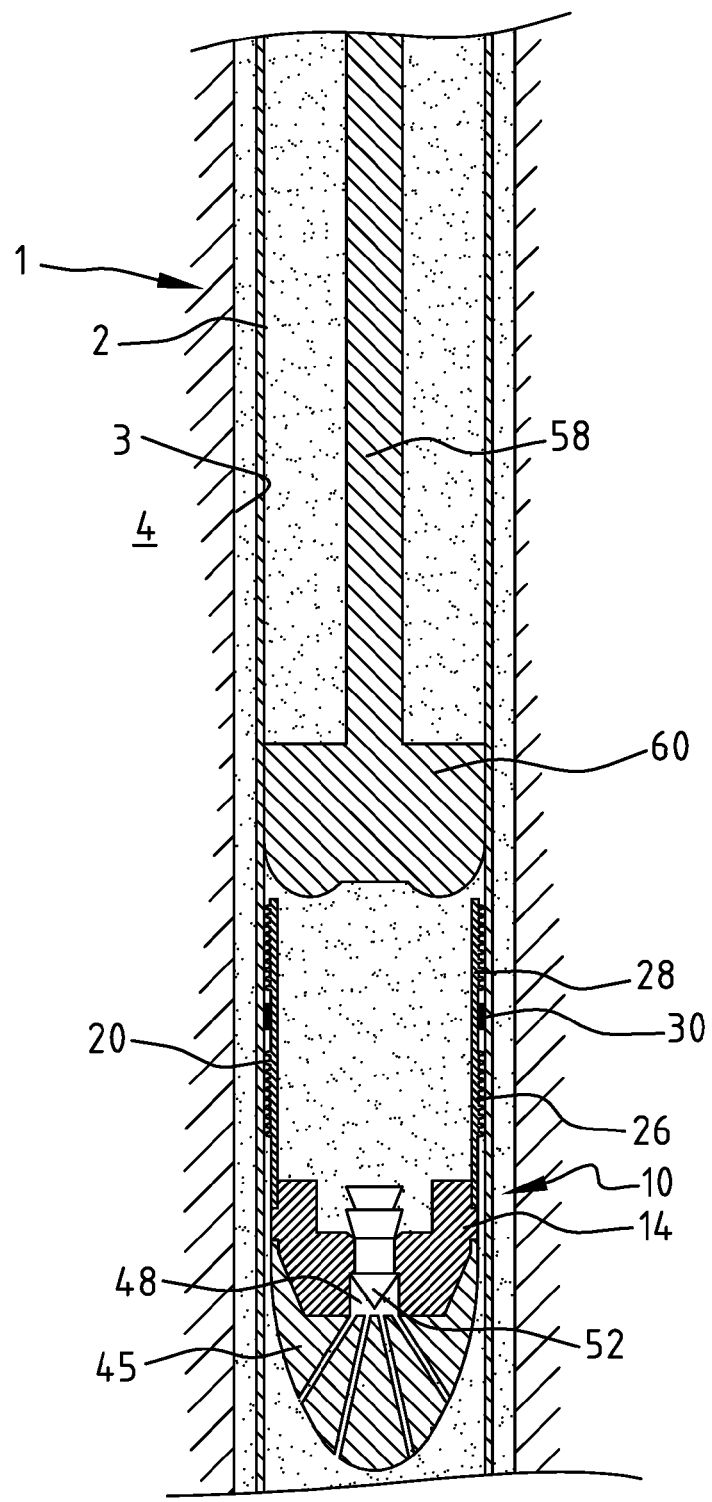
FIG. 5 schematically shows the assembly during drilling-out of the bottom plug.

Referring further to FIG. 5 there is shown the assembly 1 after tubular element 2 has been fully expanded, and the expansion mandrel 8 and the plug mandrel 12 together with the secondary expander 22 and the debris cap 42 have been removed from the wellbore 3. A drill string 58 with a polycrystalline diamond compact (PDC) bit 60 is lowered into the expanded tubular element 2 to drill out the remainder of the bottom plug 10. Instead of the PDC bit 60, a dedicated milling tool may be applied to drill out the remainder of the bottom plug.

Figure 6:
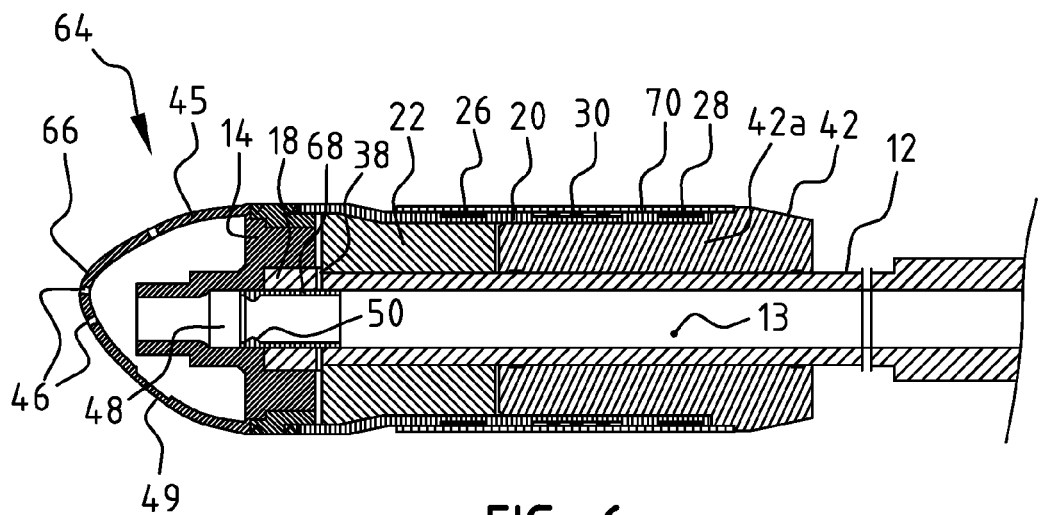
FIG. 6 schematically shows a modified bottom plug of the assembly.

Referring further to FIG. 6 there is shown a modified bottom plug 64 which is substantially similar to the bottom plug 10 except regarding the following. The reamer 45 has a nose section 66 arranged eccentrically relative to a central longitudinal axis of the plug mandrel 12. Furthermore, the modified bottom plug 64 is provided with an activation sleeve 68 positioned in the bore 48 to temporarily close the flow ports 38. The activation sleeve 68 is locked in place by suitable shear pins (not shown) and is adapted to slide axially downward through the bore 48 when the shear pins are broken whereby the flow ports 38 are freed. The seat 50 for the trailing plug 52 is provided in the activation sleeve 68 rather than in the bore 48. Furthermore, the modified bottom plug 64 is provided with a protective sleeve 70 extending around the sealing section 30 and the anchoring sections 26, 28 of the clad element 20. The sleeve 70 is fixedly connected to the debris cap 42, the latter having a cylindrical part 42a that extends into the clad element 20 and abuts against the secondary expander 22. Reamer 45, flange 14 and clad element 20 are interconnected by a crossover sub 71. The reamer 45 has an internal chamber 47 that fluidly connects fluid channel 13 with the outlet openings 46.

Normal operation of the assembly 1 is as follows. The assembly 1 is lowered into the wellbore 3 on drill string whereby optionally the assembly 1 may be rotated to ream sections of the wellbore 3 by reamer 45, and drilling fluid may be pumped into the wellbore. Once the assembly 1 has reached target depth of the wellbore, the tubular element 2 is at its upper end anchored in the wellbore 3. Subsequently a volume of leading spacer fluid (not shown) is pumped into the wellbore via the fluid channel 13 to clean the fluid channel from drilling fluid, followed by the fluidic cement column 53 and a volume of trailing spacer fluid. Instead of trailing spacer fluid, drilling fluid may be used. The leading spacer fluid and the fluidic cement 53 may be separated by a foam ball that crushes upon arriving in the bore 48 of the bottom plug 10 and is released through the outlet openings 46. The fluidic cement 53 and the trailing spacer fluid are separated by the trailing plug 52 that seats on the seat 50 upon arriving in the bore 48. Thus, at this stage trailing spacer fluid is present in the fluid channel 13, and the cement column surrounds the bottom plug 10 and the tubular element 2. The trailing plug 52 closes the bore 48 and thereby seals the fluid channel 13 from the annular space around the assembly 1 in the wellbore 3. The primary expander 6 abuts against the lower end of the tubular element 2 therefore fluidic cement cannot enter the tubular element 2 (FIG. 2).

After seating of the trailing plug 52 in the bore 48, the primary expander 6 is pulled into the tubular element 2 by pulling the drill string whereby the lower portion 54 of the tubular element 2 is expanded. Expansion is proceeded until the bottom 10 plug is fully inside the expanded lower portion 54. While maintaining the drill string under tension, fluid pressure is applied in the fluid channel 13 so that the trailing spacer fluid flows via the flow ports 38 of the plug mandrel 12 into the fluid chamber 40. The secondary expander 22 thereby slides along the plug mandrel 12 away from the flange 14 and gradually expands the clad element 20 against the expanded lower portion 54 of the tubular element 2. The lower anchoring section 26 first engages the expanded lower portion 54, followed by the sealing section 30 and subsequently the upper anchoring section 28. Upon the sealing section 30 engaging the expanded lower portion 54, the tubular element 2 is simultaneously further expanded with the primary expander 6 to maintain volume balance in the expanded section of the tubular element 2 between the bottom plug 10 and the primary expander 6.

Once the clad element 20 is fully expanded against the expanded tubular element 2, the secondary expander moves out of the clad element and thereby pushes the debris cap 42 off the clad element 20. The interior of the expanded clad element 20 is then filled with trailing spacer fluid or drilling fluid that may be contaminated with cement. In a subsequent step the remainder of the tubular element 2 is expanded with the primary expander 6 whereby the secondary expander 22 and the debris cap 42 are carried out of the wellbore 3 on the plug mandrel 12 (FIG. 4). After the bottom plug 10 has been set in the expanded lower portion 54 of the tubular element, fluid pressure can be applied below the primary expander 6 via the fluid channel 13 to provide additional upward force to the primary expander 6 (hydraulic assist). Alternatively, the entire expansion force required to expand the tubular element 2 may be provided by such fluid pressure, that is without applying tensile force to the drill string.

The design functionality of the upper and lower anchoring sections 26, 28 and the sealing section 30 is as follows. When the fluid pressure in the interior space of the fully expanded clad element 20 is higher than the fluid pressure below the bottom plug 10, the clad element is subjected to balloon deformation whereby the lower anchoring section 26 becomes firmly pressed against the expanded tubular element 2. Conversely, when the fluid pressure below the bottom plug 10 is higher than the fluid pressure in the interior space of the fully expanded clad element 20, for example due to swab pressure below the primary expander 6 during expansion of the tubular element 2, the clad element is subjected to balloon deformation whereby the upper anchoring section 28 becomes firmly pressed against the expanded tubular element 2.

After the cement has fully cured, the bottom plug 10 is drilled out with the PDC bit 60 or milling tool on drill string 58 whereby the bottom plug is supported by the cement 53 surrounding it (FIG. 5).

In a variation of normal use, the cement 53 is pumped into the wellbore after the lower portion 54 of the tubular element has been expanded and the bottom plug 10 has been pulled into the expanded lower portion 54. This approach may be followed if there is a risk that the secondary expander 22 is activated before the bottom plug 1 is inside the lower portion 54 of the tubular element, e.g. due to pressure waves in the fluid channel 13 propagating into the fluid chamber 40 during pumping of cement into the wellbore. However since in the alternative method there is reduced annular space between the expanded lower portion 54 of the tubular element and the wellbore wall, the pressure drop required to pump the cement at a certain rate through the annular space increases, which may lead to an increased risk of formation fracturing in critical pressure regimes.

Stabilization of the PDC bit or milling tool 60 during drilling-out of the bottom plug 10 may be optimized as follows. In the methods described above the clad element 20 is hydraulically expanded with the trailing spacer fluid 56 as a pressure medium. Consequently after completion of the expansion process the interior of the clad element 20 is filled with trailing spacer fluid that may be contaminated with some cement. In order to optimize stabilization of the PDC bit or milling tool 60 during drilling-out of the bottom plug 10 an additional volume of cement may be pumped behind the trailing plug 52 to expand the clad element 20. A trailing foam ball (not shown) may be pumped behind the cement, optionally followed by trailing spacer fluid. After the trailing plug 52 has seated in the bore 48, the installation process is continued as described above whereby the pressure medium used for the expansion of the clad element 20 is cement rather than trailing spacer fluid or drilling fluid. During expansion of the tubular element 2 the trailing foam ball is pumped out of the plug mandrel 12 into the wellbore. Thus, after curing of the cement the bottom plug 10 is surrounded by cured cement, optionally with excess cured cement above the clad element 20 to mitigate the risk of damage to the PDC bit or milling tool 60 upon tagging the bottom plug 10 and to provide optimum conditions for drilling-out of the bottom plug 10.

In addition to the above, the risk of damage to the cutters of the PDC bit or milling tool 60 when tagging the top of the clad element 20 can be further mitigated by connecting a short pipe section (not shown) of a soft metal, for example copper, to the top of the clad element 20. The pipe section is subjected to plastic deformation due to loading by the PDC cutters thereby limiting the peak contact load and thus the risk of impact damage to the PDC cutters.

Normal operation of the assembly 1 when provided with the modified bottom plug (FIG. 6) is substantially similar to normal operation described above. In addition the eccentric nose section 66 of the reamer 45 helps in preventing rotation of the reamer during drilling out the bottom plug 10 with the PDC bit 60 or the milling tool. The activation sleeve 68 prevents unintentional expansion of the clad element 20 by the secondary expander 22 due to fluid pressure peaks in the fluid channel 13 before the trailing plug 52 has landed in the activation sleeve. As the trailing plug 52 lands into the activation sleeve 68, the trailing plug pushes the activation sleeve downward whereby the shear pins 69 are broken and the flow ports 38 are freed. Furthermore, the protective sleeve 70 protects the sealing section 30 and the anchoring sections 26, 28 before expansion of the clad element 20. During expansion of the clad element 20, the protective sleeve 70 moves in axial direction away from the clad element 20 together with the debris cap 42. In this manner optimum protection is provided to the sealing section 30 and the anchoring sections 26, 28 which become exposed only just before the secondary expander expands these sections.

Figure 7:
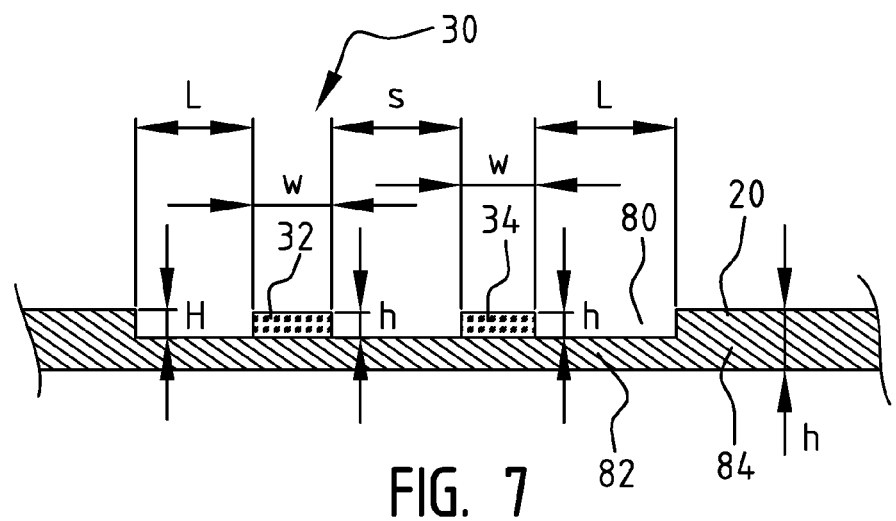
FIG. 7 schematically shows a sealing section of a clad element of the assembly in more detail.
Figure 7A:
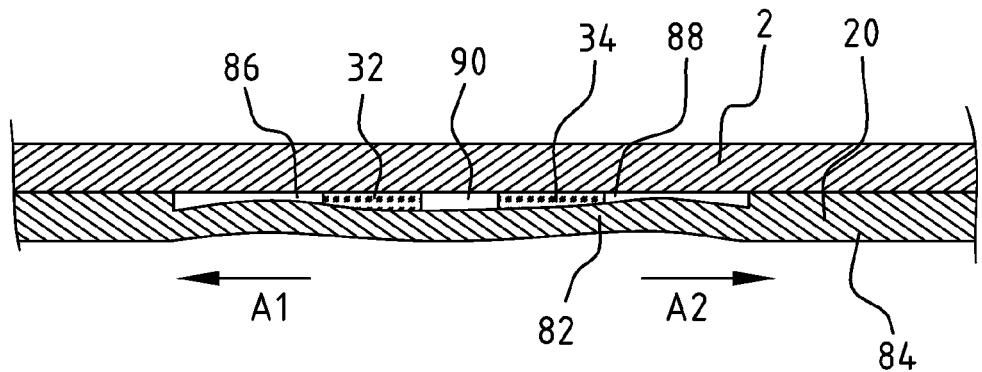
FIG. 7a schematically shows the sealing section after expansion of the clad element.

Reference is further made to FIGS. 7, 7a showing a longitudinal section of the sealing section 30 before expansion (FIG. 7) of the clad element 20 and after expansion (FIG. 7a) of the clad element 20. The sealing section 30 includes an annular groove 80 formed in outer surface of the clad element 20, in which the annular seals 32, 34 are arranged. The annular groove defines a section of reduced wall thickness 82 of the inner tubular element relative to a remaining section 84 of the clad element 20.

The following parameters of the sealing section 30 are referred to hereinafter:

w=axial length of the annular seals;
s=axial spacing between the annular seals;
L=axial spacing between annular seal and nearest axial end of the groove;
h=radial thickness of the annular seals;
H=depth of the groove;
t=wall thickness of the remaining section 84 of the clad element;
k=depth of a wear groove (not shown) in tubular element 2, for example caused by sliding contact of a drill string along the inner surface of tubular element 2 during drilling of the wellbore;
R=round-off radius of the secondary expander 22, being the radius, seen in longitudinal section, of a rounded section (not shown) at the large diameter end of the conical section of the secondary expander.

Suitable values for these parameters may be based on the following characteristics:

Elastomer Shore A hardness value of annular seals: 70 to 90;
Aspect ratio of annular seals h/w: 3-5;
Spacing ratio of annular seals s/w: 1-2
Ratio h/k: >5;

Ratio h/H: <=1;
Ratio L/t: >9;
Ratio R/t: <20.

The annular seals 32, 34 do not protrude outside the annular groove 80 and are thereby protected from damage during running-in of the assembly 1 into the wellbore. During expansion of the clad element 20, the section of reduced wall thickness 82 of the clad element is subject to surplus expansion which is a know phenomenon and implies that the section 82 expands to a slightly larger inner diameter than the maximum diameter of the secondary expander 22. The degree of surplus expansion depends on various factors such as, for example, the round-off radius of the secondary expander 22.

The remaining section 84 of the clad element 20 is compressed against the inner surface of the tubular element 2 during the expansion process, and is thereby prevented from surplus expansion. As the section of reduced wall thickness 82 undergoes surplus expansion, the annular seals 32, 34 are compressed against the inner surface of the tubular element 2 and thereby provide a sealing contact between the clad element 20 and the tubular element 2. The annular seals 32, 34 also locally counter-act surplus expansion of the section 82 so that, as a result, the section 82 assumes a wave-shaped profile. The wave-shaped profile defines a chamber 86 in the annular groove 80 that converges from seal 32 in axial direction A1 (FIG. 7a), a chamber 88 in the annular groove 80 that converges from seal 34 in axial direction A2, and a chamber 90 in the annular groove 80 in between the seals 32, 34. Convergence in this respect means that the radial width of each chamber 86, 88 decreases in the indicated axial direction A1, A2.

When the bottom plug 10 is subjected to a differential fluid pressure across the sealing section 30 whereby the fluid pressure in chamber 86 is higher than in chamber 88, annular seal 34 slightly deforms into chamber 88. As a result seal 34 becomes more compressed and is thereby self-activating. Similarly, when the fluid pressure in chamber 88 is higher than in chamber 86, annular seal 32 slightly deforms into chamber 86. As a result seal 32 becomes more compressed and is thereby self-activating. The shape of the chambers 86, 88 in combination with the aspect ratio of the seals 32, 34 enables the fluid pressure to energize the seals 32, 34 so that the contact pressure between the seals and the steel counter surface is always higher than the applied fluid pressure.

The degree of compression of the seals 32, 34 may tuned to the desired compressive stress by suitably tuning one or more of the parameters indicated above. In this manner the desired degree of compression of the seals 32, 34 may be obtained irrespective of the compressive force at which the clad element 20 is expanded against the tubular element 2, contrary to the prior art where the expansion process needs to be performed at a very precise expansion ratio to prevent damage to the seals.

Figure 8:
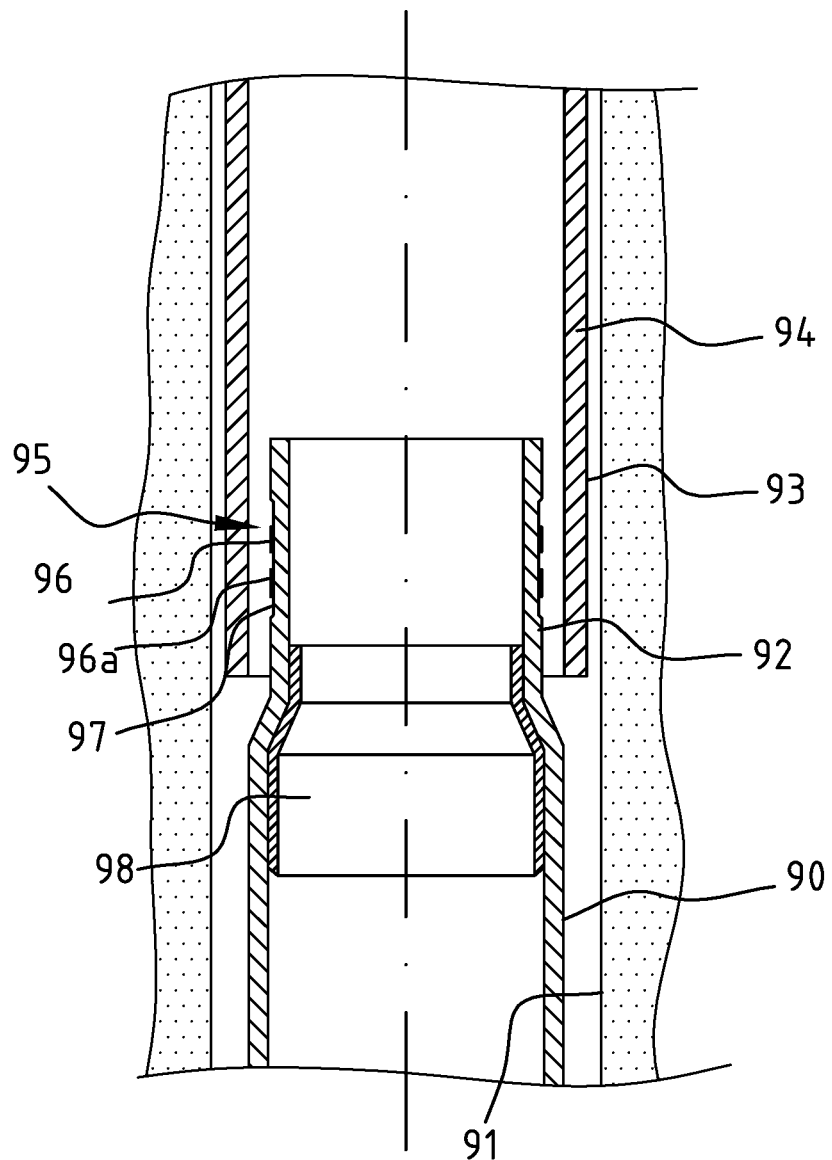
FIG. 8 schematically shows a second embodiment of the system of the invention.

FIG. 8 shows another application of the system of the invention. An expandable casing 90 is arranged in a wellbore 91 whereby an upper portion 92 of the casing 90 extends into a lower portion 93 of a high strength host casing 94. The upper portion 92 is provided with a sealing section 95 including annular seals 96, 96a arranged in an annular groove 97 formed in the outer surface of the upper portion 92. The sealing section 95 is similar to the sealing section 30 described hereinbefore. An expander 98 is moved in upward direction through the casing 90 so as to radially expand the casing 90 whereby the upper portion 92 is compressed against the inner surface of the host casing 94. The annular seals 96, 96a are thereby compressed against the inner surface of host casing 94 in the same manner as compression of the annular seals 32, 34 described hereinbefore. Deformation of the host casing 94 is small in order to keep the required expansion forces within acceptable limits. The outer surface of casing 90 may be provided with sections of friction material (not shown) to increase the anchoring capacity of the casing 90 in the host casing 94, thus mitigating any sliding displacement of the elastomer annular seals 96, 96a relative to the steel surface of host casing 94 under well service conditions.

In case the upper portion 92 of casing 90 and the lower portion 93 of previous casing 94 are to be expanded simultaneously by the action of expander 98, for example in order to create a mono-diameter well whereby casing 90 is expanded to the same internal diameter as previous casing 94, a section 99 of the wall of lower portion 93 opposite the annular groove 97 is subjected to less expansion than the remaining wall section of lower portion 93. The wall section 99 thereby assumes a wave-shaped profile that enhances the degree of convergence of chambers 86, 88 and thus contributes to the self-activating action of the annular seals 96, 96a.

The compliance of the elastomer seals in combination with the high compressive stresses generated in the seals during expansion enables irregularities at the inner surface of the outer tubular element to be sealed-off. Such irregularities may be, for example, casing wear grooves or roughness resulting from the pipe manufacturing process. Furthermore if the outer tubular element is subject to "ballooning" (i.e. inflation) due to high internal pressures, the elastomer seals accommodate such effect by virtue of their elastic properties.

A plurality of annular seals described above may be applied in series in a relatively wide annular groove or in separate annular grooves on a dedicated liner seal sub. Furthermore a number of such liner seal subs can be applied in a monodiameter liner string whereby each liner seal sub is arranged in an overlap section of two interconnected liners.

Further, it was found that the ultimate pressure rating of the sealing system increases with increasing number of annular seals, either in a single annular groove or in a plurality of annular grooves arranged in series.

The present invention is not limited to the above-described embodiments thereof, wherein various modifications are conceivable within the scope of the appended claims. For instance, features of respective embodiments may be combined.

The invention claimed is:

1. A system for creating a sealing tubular connection in a wellbore, the system comprising:
   an outer tubular element;
   an inner tubular element extending into the outer tubular element and being adapted to be radially expanded against the outer tubular element by an expansion cone;
   an annular groove defining a section of reduced wall thickness of the inner tubular element relative to a remaining section of the inner tubular element, wherein the annular groove has opposite axial ends; and
   at least one annular seal of resilient material positioned in the annular groove, each annular seal having a radial thickness, which is smaller than, or equal to, a depth of the annular groove;
   wherein the at least one annular seal is axially spaced from at least one of the axial ends of the groove, and the section of reduced wall thickness is adapted to be subject to surplus expansion induced by the expansion cone such that, in the expanded state of the inner tubular element, the annular groove has a wave-shaped profile which defines a chamber in the annular groove between the annular seal and one of the axial ends that has a first portion which converges in axial direction from the annular seal to the axial end whereby the radial width of the axial chamber decreases in said axial direction, followed by a second portion which diverges in said in axial direction to the depth of the annular groove, whereby the annular seal is compressed against the outer tubular element.

2. The system of claim 1, wherein each annular seal comprises an elastomer material of hardness between 70-90 Shore A and the wave-shaped profile has a W-shape and for each annular seal the W-shaped profile defines a chamber in the annular groove that converges in axial direction away from the annular seal.

3. The system of claim 1, wherein, in the unexpanded state of the inner tubular element, each annular seal has an aspect ratio h/w between 3-5, wherein h is a radial thickness of the annular seal and w is an axial length of the annular seal.

4. The system of claim 1, wherein a wear groove is formed at the inner surface of the outer tubular element caused by sliding contact of a drill string along the inner surface of tubular element, and wherein in the unexpanded state of the inner tubular element the ratio h/k is larger than 5, wherein h is radial thickness of the annular seal and k is depth of the wear groove.

5. The system of claim 1, wherein the expansion cone has a conical section and a rounded section at the large diameter end of the conical section, and wherein the ratio R/t is less than 20 whereby R is round-off radius of the rounded section and t is wall thickness of said remaining section of the inner tubular element.

6. The system of claim 1, wherein each annular seal is axially spaced from at least one of said axial ends at a spacing L, and wherein the ratio L/t is larger than 9 whereby t is wall thickness of said remaining section of the inner tubular element.

7. The system of claim 1, wherein each annular seal is arranged in a central part of the annular groove.

8. The system of claim 1, comprising a first annular seal and a second annular seal within the annular groove, with a spacing s between the first and second annular seals, wherein the ratio s/w is between 1-2 whereby w is the axial length of at least one of the first and second annular seals.

9. The system of claim 8, wherein the first and second annular seals are substantially identical.

10. The system of claim 1, wherein each annular seal is bonded to the surface of the annular groove by vulcanizing.

11. The system of claim 1, wherein the outer tubular element is an expandable wellbore casing or liner.

12. The system of claim 11 wherein the inner tubular element is a clad element included in a bottom plug of an assembly for expanding the wellbore casing or liner.

13. The system of claim 1, wherein the outer tubular element is an upper wellbore casing or liner, and wherein the inner tubular element is a lower wellbore casing or liner.

14. A method of creating a sealing tubular connection in a wellbore, the method comprising:
providing an outer tubular element and an inner tubular element extending into the outer tubular element, the inner tubular element being adapted to be radially expanded against the outer tubular element, wherein the inner tubular element is provided with an annular groove defining a section of reduced wall thickness of the inner tubular element relative to a remaining section of the inner tubular element, wherein the annular groove has opposite axial ends;
arranging in the annular groove at least one annular seal of resilient material having a radial thickness which is smaller than, or equal to, a depth of the annular groove; and
radially expanding the inner tubular element against the outer tubular element using an expansion cone positioned in the inner tubular element;
wherein the at least one annular seal is axially spaced from at least one of the axial ends of the groove, and the section of reduced wall thickness is subject to surplus expansion induced by the expansion cone such that, in the expanded state of the inner tubular element, the annular groove has a wave-shaped profile which defines a chamber in the annular groove between the annular seal and one of the axial ends that has a first portion which converges in axial direction from the annular seal to the axial end whereby the radial width of the axial chamber decreases in said axial direction, followed by a second portion which diverges in said in axial direction to the depth of the annular groove, whereby the annular seal is compressed against the outer tubular element.

15. The method of claim 14, wherein each annular seal comprises an elastomer material of hardness between 70-90 Shore A and the wave-shaped profile has a W-shape and for each annular seal the W-shaped profile defines a chamber in the annular groove that converges in axial direction away from the annular seal.

16. The method of claim 14, wherein, in the unexpanded state of the inner tubular element, each annular seal has an aspect ratio h/w between 3-5, wherein h is a radial thickness of the annular seal and w is an axial length of the annular seal.

17. The method of claim 14, wherein a wear groove is formed at the inner surface of the outer tubular element caused by sliding contact of a drill string along the inner surface of tubular element, and wherein in the unexpanded state of the inner tubular element the ratio h/k is larger than 5, wherein h is radial thickness of the annular seal and k is depth of the wear groove.

18. The method of claim 14, wherein the expansion cone has a conical section and a rounded section at the large diameter end of the conical section, and wherein the ratio R/t is less than 20 whereby R is round-off radius of the rounded section and t is wall thickness of said remaining section of the inner tubular element.

19. The method of claim 14, wherein each annular seal is axially spaced from at least one of said axial ends at a spacing L, and wherein the ratio L/t is larger than 9 whereby t is wall thickness of said remaining section of the inner tubular element.

20. The method of claim 14, comprising a first annular seal and a second annular seal within the annular groove, with a spacing s between the first and second annular seals, wherein the ratio s/w is between 1-2 whereby w is the axial length of at least one of the first and second annular seals.

* * * * *